| United States Patent [19] | [11] Patent Number: 4,826,593 |
|---|---|
| Nev | [45] Date of Patent: May 2, 1989 |

[54] MEMBRANE FILTER PRESS

[75] Inventor: Werner Nev, Langenhagen, Fed. Rep. of Germany

[73] Assignee: Hansen-BTR GmbH, Hanover, Fed. Rep. of Germany

[21] Appl. No.: 54,401

[22] Filed: May 26, 1987

[30] Foreign Application Priority Data

May 26, 1986 [DE] Fed. Rep. of Germany ....... 3617651
Feb. 23, 1987 [EP] European Pat. Off. ........ 87102513.6

[51] Int. Cl.$^4$ .............................................. B01D 25/12
[52] U.S. Cl. .................................... 210/229; 100/211; 100/295; 210/231
[58] Field of Search ............... 210/224, 227, 228, 229, 210/230, 231; 100/211, 295

[56] References Cited

U.S. PATENT DOCUMENTS 4,608,164 8/1986 Neu ...................................... 210/231

FOREIGN PATENT DOCUMENTS 3424325 1/1986 Fed. Rep. of Germany .
2110104 6/1983 United Kingdom ................ 210/231
2153248 8/1985 United Kingdom .

Primary Examiner—Richard V. Fisher
Assistant Examiner—W. Gary Jones
Attorney, Agent, or Firm—Rober E. Burns; Emmanuel J. Lobato

[57] ABSTRACT

A filter press comprises a plurality of membrane filter plates each comprising a base plate and an elastic membrane on at least one side of the base plate. The base plate has a circumferential raised plane edge portion surrounding a recess with a step-form recessed circumferential surface between the raised edge portion and the recess and a groove in the recessed circumferential surface and the raised edge portion. The membrane has a reinforced edge poriton of angular cross section with a first web lying on said recessed circumferential surface of the base plate and having a bevelled edge engaging the shoulder between the recessed circumferential surface and the raised edge portion and a second web received in the groove to provide a seal between the membrane and the base plate. The outer surface of the first web is recessed below the plane of the raised edge portion of the base plate. The base plate may have a flat-top support projection in the recess, in which case the membrane has an opening with a reinforced edge to accomodate the support projection. A seal is provided between the membrane and base plate around the support projection in the same manner as around the circumference of the base plate and membrane.

8 Claims, 6 Drawing Sheets

MEMBRANE FILTER PRESS

The invention relates to a filterpress with a plurality of membrane filterplates which comprise a base plate and, on at least one side surface of the base plate, an elastic membrane. The base plate has a circumferential raised flat edge portion which surrounds a recess. At the transition of the edge portion into the recess, the base plate has a circumferential step-form recessed surface to receive the edge portion of the membrane. Inwardly of the raised edge portion, the circumferential recessed surface of the base plate has a circumferential groove. The membrane has a reinforced edge portion of angular cross section of which an outwardly directed web has a bevelled edge and is wider on the side lying on the base plate than on the opposite side and of which the other web is directed toward the base plate and mates with the groove in the base plate.

Membrane filterpresses of this kind are known from DE-OS No. 34 24 325. The base plates of these membrane filter plates are advantageously made of plastic, in particular polypropylene, while the membrane is formed of a elastomer, preferably rubber.

While earlier the membranes covered the entire edge of the base plate and were then fastened on the outer edges of the membranes, in the membrane filter plates of U.S. Pat. No. 3,656,622 the edge of the base plate is only partially covered by the edge of the membrane. The membrane has here an edge reinforcement of swallow tail cross section which engages in a swallow tail form groove. This edge reinforcement projects beyond the edge surface of the base plate so that also with this embodiment the membranes with their edge reinforcement either engage one another (with membranes provided on both sides of the base plate) or engage the adjacent plate (with a membrane provided on one side of the base plate). Upon assembly in the filter press the membranes are heavily loaded by a pressure. As rubber is an incompressible medium the rubber between the base plates begins to flow in order to reduce this pressure. This flow of the edge reinforcement of membranes produced of rubber reduces the life of the membranes considerably. In order to limit the loading of the edge reinforcements of the membranes, the filterpress can be operated only with limited pressure. Limiting the closing pressure of the filterpress indeed leads to prolonging the life of the membranes but on the other hand requires the filterpress itself to be operated with limited pressure in filtering so that it operates with limited efficiency.

GB-OS No. 21 53 248 seeks to avoid the above-mentioned objections in that here a membrane of thermoplastic material is used which has as edge reinforcement a lip which engages in a groove in the base plate and is only held in tight engagement in the groove by one surface of the adjacent plate in such manner that a compression of the membrane between the adjacent plates is largely avoided. However, by this alone the life of the membrane is not lengthened. There must be provided in the base plate a further parallel groove which receives a section of the edge of the membrane of semi-circular cross section so that the membrane in this location gains increased elasticity. This leads to an increased width of the edge region of the base plate and hence a reduced capacity of the filter chamber between the membranes for the filter materials. This construction has a further disadvantage that the membranes on the opposite sides of a filter plate must be connected with one another in the region of the central opening so that in removal of the filter material with an opened filterpress and vertically arranged base plates the membranes do not fall out and have to be mounted again. Such connection of two membranes can be realized only with membrane filter plates of small dimensions. The mounting of the membranes is hereby rendered difficult.

The membrane filter plates of DE-OS No. 34 24 325 does not have this disadvantage. The membranes arranged on the opposite sides of the membrane filter plate are not connected with one another but are individually mounted and are held in fixed position through an edge reinforcement of the membrane of angular cross section of which an outwardly directed web has a bevelled edge whereby the side lying on the base plate is longer than the opposite and of which the other web is directed toward the base plate and engages in a groove in the base plate. This membrane edge thereby projects only a limited amount beyond the edge plane of the base plate. The part of the edge of the base plate not covered by the edge of the membrane forms the sealing surface and transmits the closing force. The membrane is here only slightly stressed but on account of the almost total incompressible property of the rubber of the membrane and on account of manufacturing tolerances, space must be provided in which the rubber can flow. In the event of considerable oversize of the edge of the rubber membrane, undesired flow occurs.

The measures referred to above serve jointly to hold the filter chamber between the two membranes or between a membrane and the facing surface of an adjacent plate so tightly that the interior of the filter chamber formed between the membranes can be operated at high filter pressure. Not only is the filterpress operated with pressure (in the filter chamber) during the filtering operation but it is operated at still higher pressure at the end of the filtering operation in another place, namely in the space between the membrane and the base plate for the purpose of forcibly compressing the filter cake before opening of the filterpress in order to press out any liquid remaining in the filter cake. As the pressure medium here used must not penetrate into the filter chamber, it is necessary to provide special sealing measures which the state of the art often does not satisfy or is attainable only at high expense.

The invention avoids these disadvantages. It is an object of the invention to avoid subjecting the membrane to the closing pressure of the filterpress and with simple means to achieve an exceptionally good sealing not only of the filter chamber but also of the space between the membrane and the base plate.

The invention achieves these objectives in that the edge of the membrane is clamped (wedged) between an undercut shoulder in the edge region of the base plate and the wall of the groove in the base plate nearest the recess, that the surface of the edge portion of the membrane lies below the plane of the edges of the base plate and that only the filter cloth and/or a sealing medium is interposed between the edges of the base plate in the filterpress.

This arrangement of the membrane has the advantage that the membrane is not at all subjected to the closing pressure of the filterpress and hence the rubber of the membrane is not caused to flow by the closing pressure. This increases the life of the membrane considerably. Thereby an effective sealing is achieved through the sealing of the edges of the base plate lying on one another as well as through the sealing of the wedged edges of the membrane. Through the effective pressure in the interior of the filter chamber acting on the edge of the membrane the web of the angle-form membrane edge in the groove is pressed into the groove and achieves an effective seal. A satisfactory sealing of the filter chamber during the filtering process is thereby achieved. When at the end of the filtering operating a pressure medium is introduced into the space between the membrane and the respective base plate frequently under still higher pressure, the membrane edge in the region of the web engaging the groove is raised while the edge of the membrane in the region of the undercut shoulder is held fast because the undercutting prevents movement of the membrane edge. Thus in spite of the raising of the web in the groove an especially good seal is achieved by reason of the side of the web facing the recess being pressed even more firmly on the wall of the groove nearest the recess. Thus an especially effective seal is achieved in all loading conditions.

An especially good seal is achieved when the transition of the bottom of the groove into the side walls is rounded and when the transition of the top of the web of the membrane reinforcement into the side walls of this web are likewise rounded. At the same time this construction avoids the formation of cracks in the base plate arising from a sharp edge formation of the transition of the groove body into the groove side wall. With the known construction in which the membrane edge is subjected at least in part to the closing pressure, such cracks can occur when the lip of the membrane edge in the groove completely fills the groove. To avoid this, an inner space can be left between the top of the lip of the membrane edge and the bottom of the groove. However, this construction gives rise to difficulties in sealing.

On the same grounds it is advantageous when the transition of the undercut shoulder into a recessed surface of the edge portion of the base plate is rounded. If the filterpress is provided with one or more support projections arranged in the recess, the membrane has an opening in the region of the support projection through which the support projection extends. With this construction the support projections of adjacent filter plates rests on one another without the rubber membrane between the support projections so that the membrane is not stressed by the closing pressure of the filterpress. In this embodiment the membrane has around the opening an angular projection turned toward the base plate which grips in an angular groove of the base plate. These places can give rise to leakage. In these places, the membrane springs from the base plate as soon as air pressure is introduced between the membrane and the base plate.

In accordance with the invention, this disadvantage is thereby avoided that the support projection is of truncated cone form in cross section with the wider base outwardly and that the membrane around the support projection has an edge reinforcement which in the cross section has the form of an angle of which one shank is formed as a projection and of which the other shank has a bevelled edge with the side line on the base plate longer than the opposite side whereby the outer surface of the edge reinforcement lies below the upper surface of the support projection.

With this construction of the support projection and the membrane, the membrane does not spring away from the base plate when air pressure is introduced between the membrane and the base plate. With this construction of the edge of the membrane, unexpectedly high tightness is obtained.

The nature and objects of the invention will be more fully understood from the following description of preferred embodiments illustrated schematically by way of example in the accompanying drawings in which.

Figure 1:
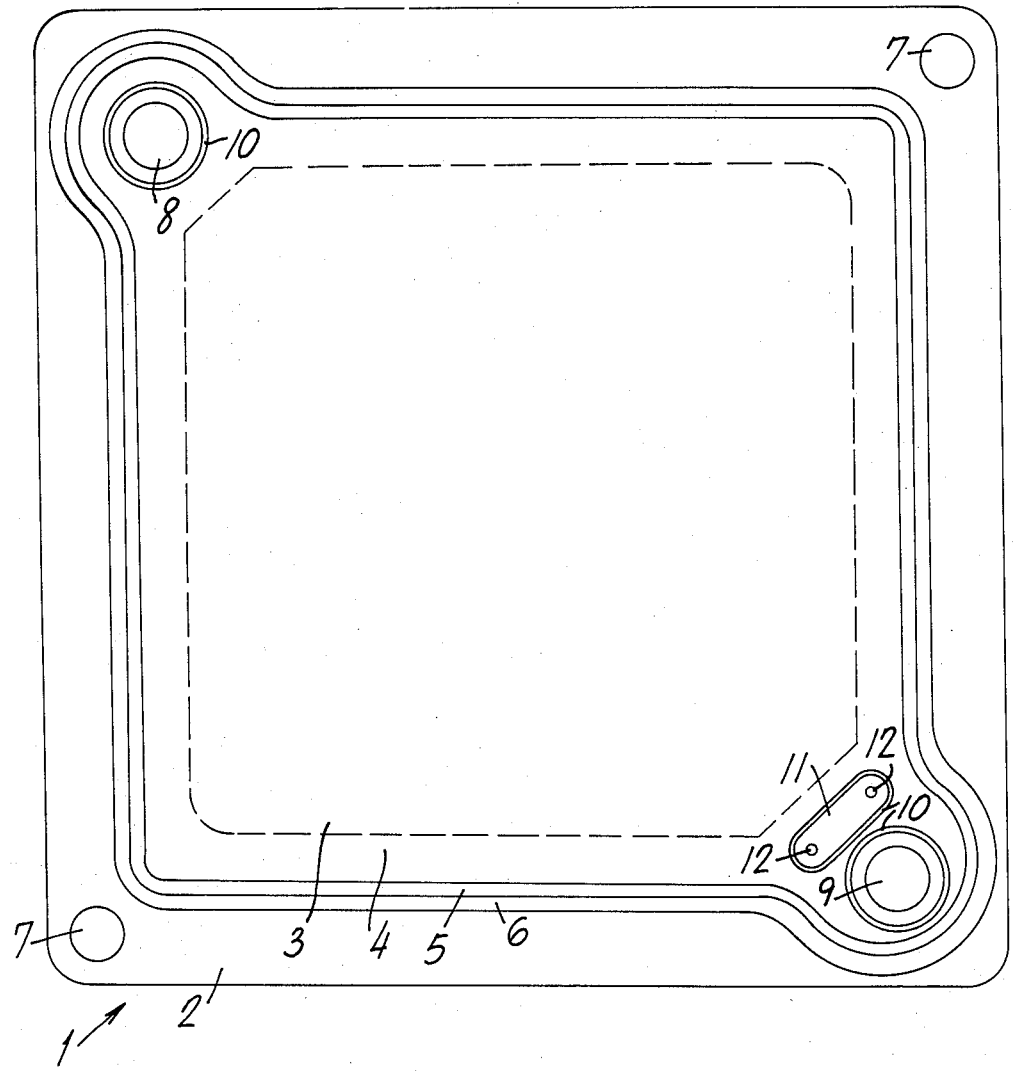
FIG. 1 is a schematic plan view of a base plate of a membrane filter plate in accordance with the invention.
Figure 2:
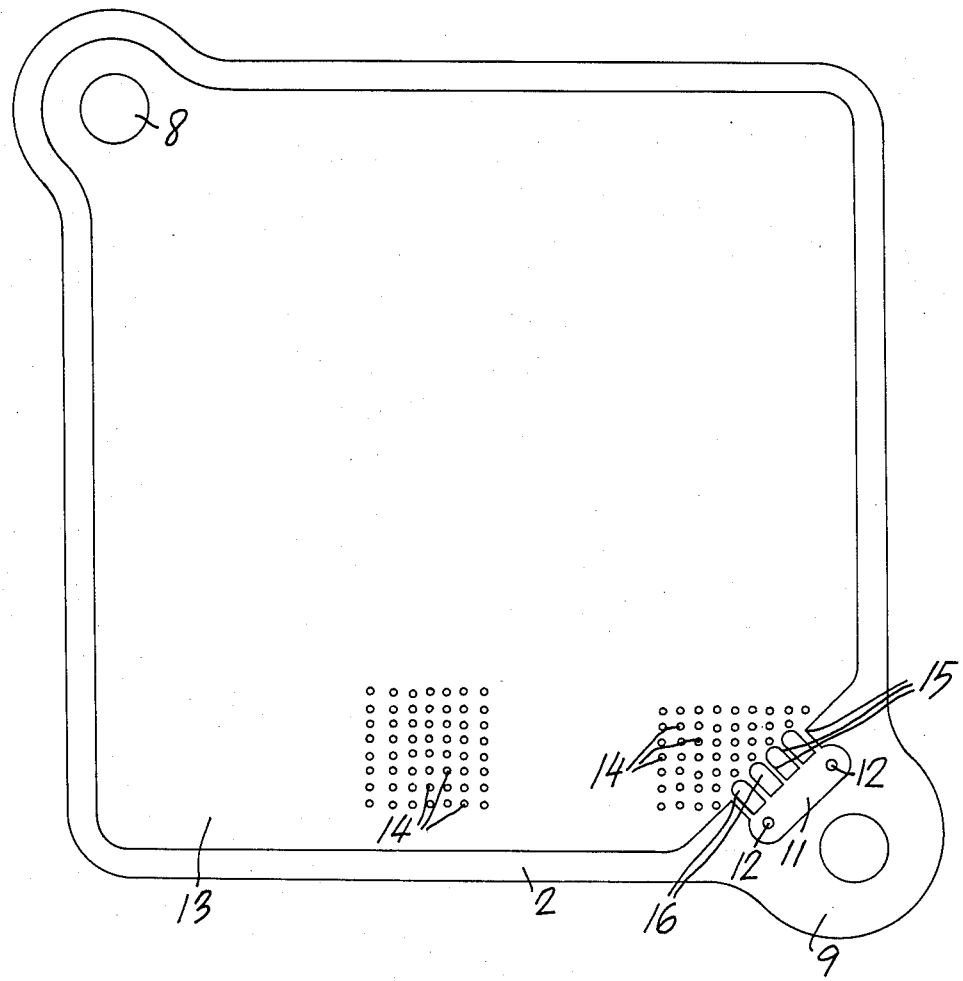
FIG. 2 is a schematic plan view of a membrane insertable into the base plate.
Figure 3:
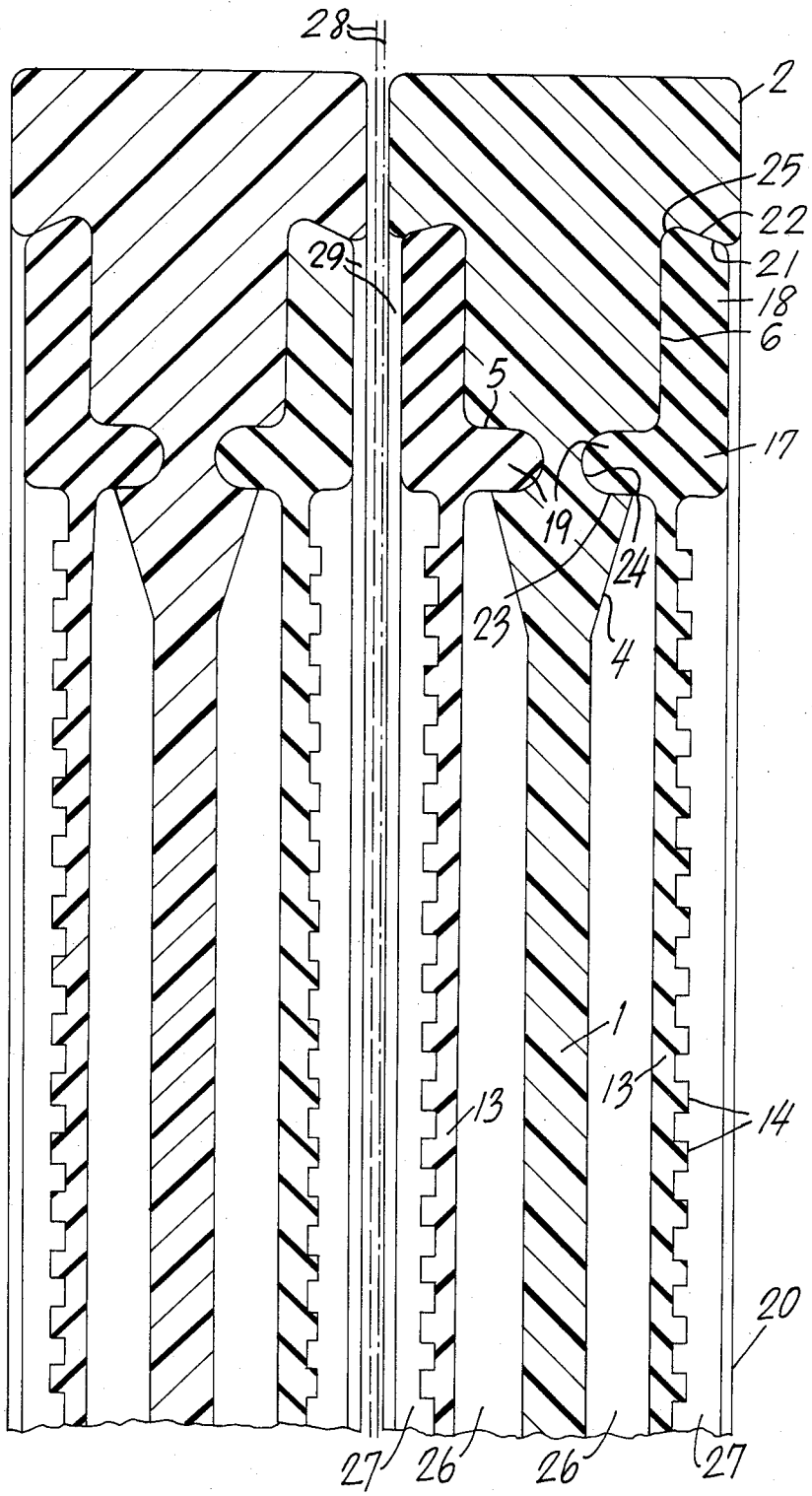
FIG. 3 is a cross section of the edge region of two membrane filter plates in a filterpress.

The base plate 1 has a plane edge 2 which surrounds on all sides a depression in the base plate 1 forming a recess 3. Inside a border portion indicated by dotted lines in FIG. 1, the recess 3 as a plane bottom surface. Between the plane edge surface 2 and the plane bottom surface of the recess 3, there is an inclined surface 4 which together with a step-form recessed surface 6 forms a transition between the plane edge surface and the plane bottom surface of the recess 3. In the transition between the inclined transition surface 4 and the step-form recessed surface 6, there is a groove 5.

At opposite corners, the base plate 1 has openings 7 in which pins of the filterpress are insertable as guide pins. The suspension to be filtered is introduced through a suspension inlet opening gate while the filtrate is discharged through a filtrate outlet opening 9. Each of the suspension inlet opening 8 and filtrate outlet opening 9 is surrounded by a groove 10 which serves the same purpose as the groove 5. In the region of the filtrate outlet opening 9, there is provided a depression 11 from which channels 12 inside the base plate 1 lead to the filtrate outlet opening 9. On opposite sides of the base plate 1 there is aplied a membrane 13. This has on its outer surface a multiplicity of knubs 14. In one corner there is a suspension inlet opening 8 and at the opposite corner in front of the depression 11, there is a row of slits 15 separated by projections 16. Through these slits 15 the filtrate escapes into the depression 11 and from there into the filtrate outlet opening 9.

In an unloaded condition, the membrane 13 provided with the knubs 14 is plane and has a edge 17 which in cross section is angle-formed of which one web lies parallel to the edge plane 20 while the other web 19 is essentially perpendicular thereto and engages in the groove 5. The web 18 lies on the recessed surface 6 of the base plate. Its upper surface is does not extend above the edge plane 20 but lies in the space between the two edge planes 20 of the base plates 1. The membrane is held fast on the base plate by virtue of a bevelled edge 21 which engages an undercut shoulder 22 of the base plate. This undercut shoulder 22 prevents separation of the membrane from the base plate because the bevelled edge 21 of the membrane is held tightly against the undercut shoulder 22 by engagement of the wall 23 of the web 19 with the side wall of the groove 5. The top 24 of the web 19 is rounded as is also the bottom of the groove 5. On the one hand this faciliates engagement of the membrane with the recessed surface 6 and the groove 5 and on the other hand produces an effective seal. Also the transition surface 25 between the undercut shoulder 22 and the recessed surface 6 is likewise rounded. Between the two adjacent membranes 13 there is formed a filter chamber while between the base plate 1 in the region of the recess 3 and the membrane 13 there is formed a pressure chamber 26.

Between each two membranes 13 and between the edge surfaces 2 of adjacent base plates 1 filter cloths 28 are inserted. Between each two webs 18 of the edges of adjacent membranes 14 there is a slot-form space 29. This results in that closing pressure of the press is transmitted only through the edge surfaces 2 of the base plate 1 and not on edge regions 17 of the membranes 3. Moreover, by virtue of this space, the pressure of the suspension in the filter chamber presses the web 18 of the membrane edge 17 tightly against the recessed surface 6 and presses the web 19 more tightly into the groove 5. When, on the other hand pressure medium is introduced into the chamber 26, this intermediate space permits the membrane edge to be raised slightly from the recessed surface 6 and from the groove 5 so that the edge portion of the membrane is wedged still more tightly between the undercut shoulder 22 engaging bevelled edge 21 of the membrane and the wall of the groove engaging web 19.

Figure 4:
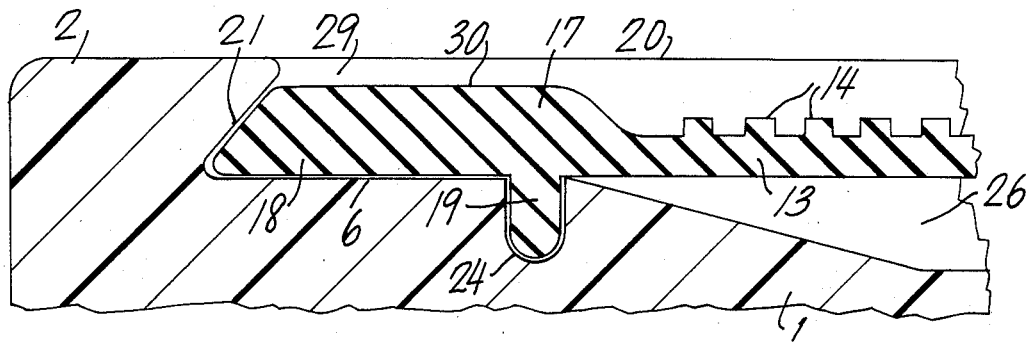
FIG. 4 is a cross section through the membrane edge as it is formed at the filter plate edge and in the region of a support projection in pressureless condition and during filtering.
Figure 5:
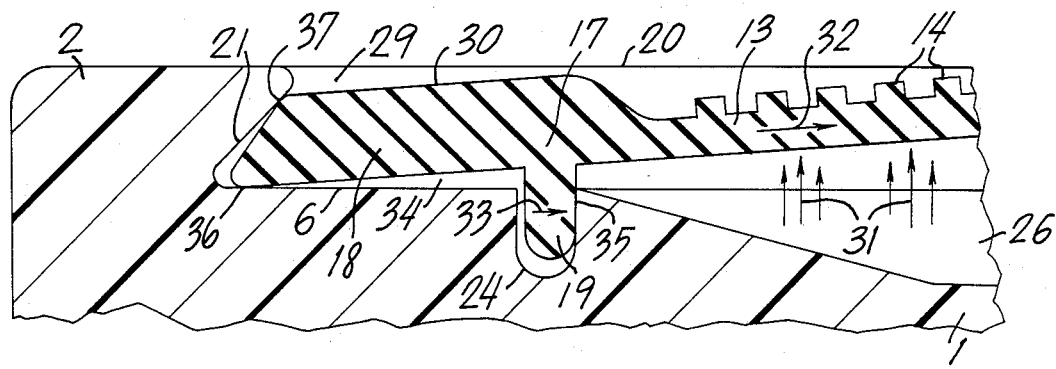
FIG. 5 is a cross section showing the condition of the membrane when air pressure is introduced between the membrane and the base plate.

The manner of operation of the membrane in accordance with the present invention is further explained with reference to FIGS. 4 and 5. In the pressure free state and during filtering when the pressure between two membranes is higher than the pressure between each membrane and the respective base plate, there is an intermediate space 29 between the edge plane 20 of the base plate and the upper surface 30 of the web 18 of the angle-formed cross section of the membrane edge 17 as seen in FIG. 4. When a suspension under pressure is introduced into the filter chamber the web 18 of the membrane edge 17 is pressed firmly against the recessed surface 6 against the base plate and the web 19 is pressed firmly into the groove 5. This intermediate space 29 is of still greater importance for the sealing function when compressed air is introduced into the pressure chamber 26 between the membrane and the respective base plate. When compressed air is introduced into the pressure chamber 26 the air pressure represented by arrows 31 causes the membrane to bow out as illustrated in FIG. 5 so that it is thereby subjected to tension as indicated by the arrow 32. The web 19 of the membrane is thereby pressed more tightly against the side wall of the groove 5 as indicated by the arrow 33. Moreover through the air pressure as indicated by the arrows 31 the entire angle-form membrane edge 17 is displaced angularly from the position shown in FIG. 4 to the position shown in FIG. 5. Through this angular displacement there is created between the recessed surface 6 from the base plate and the inner face of the web 18 of the membrane edge 17 a space 34 while the membrane edge is pressed with special force against sealing surfaces 35, 36 and 37. This leads to an increased sealing which is only possible when sufficient intermediate space 29 is provided between the outer surface 30 of the angle-form membrane edge 17 and the opposite surface 30 of membrane edge 17.

Figure 6:
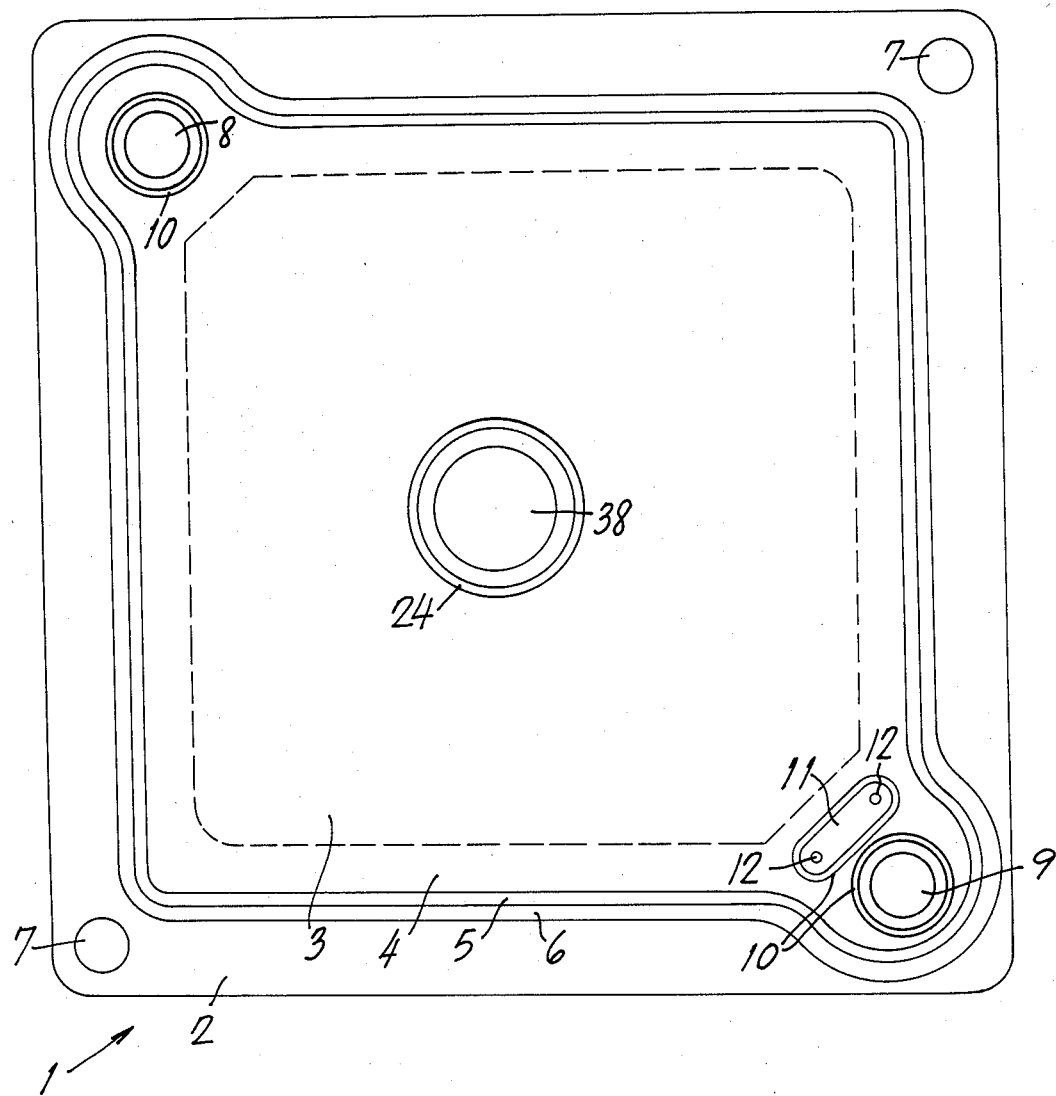
FIG. 6 is a schematic plan view of a base plate with a support projection in the middle of the recess.
Figure 7:
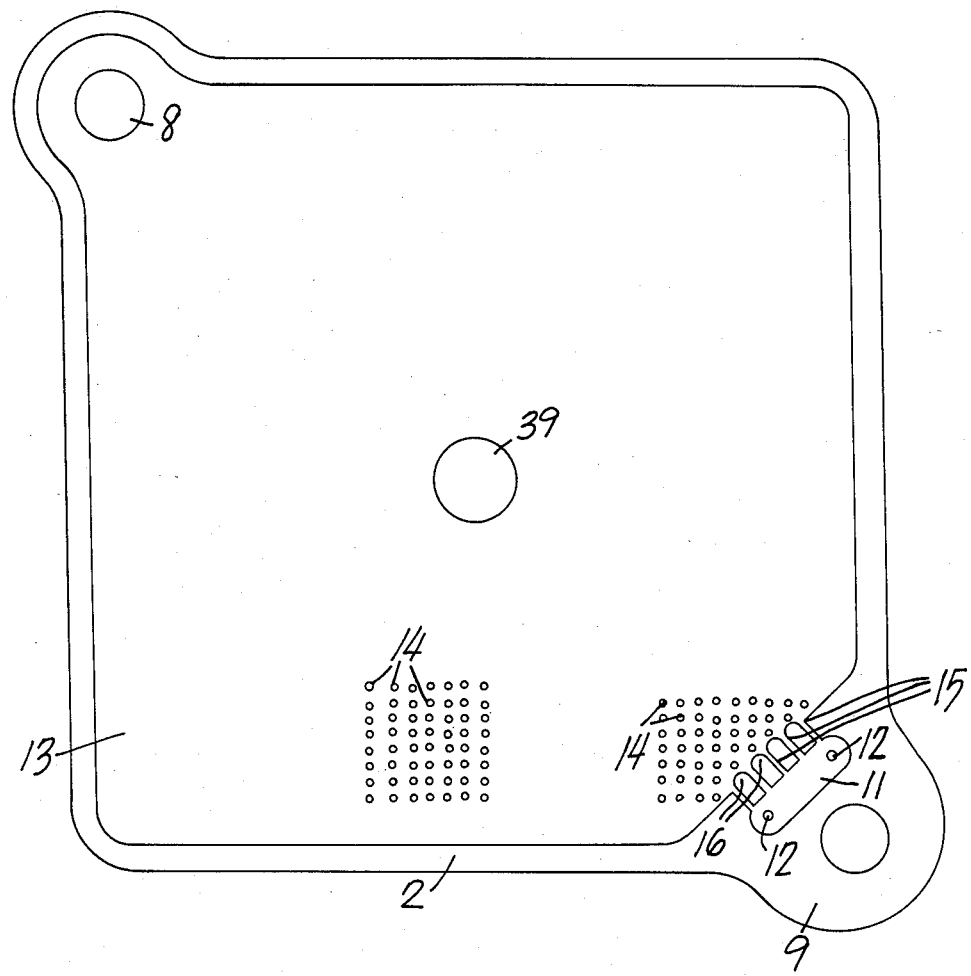
FIG. 7 is a schematic plan view of a membrane with an opening for the support projection.

If the base plate is provided with a support projection 38, then the membrane has an opening 39 to accomodate the support projection. In the embodiment illustrated in FIGS. 6 and 7 a support projection 38 is provided in the center of the base plate and the membrane.

Figure 8:
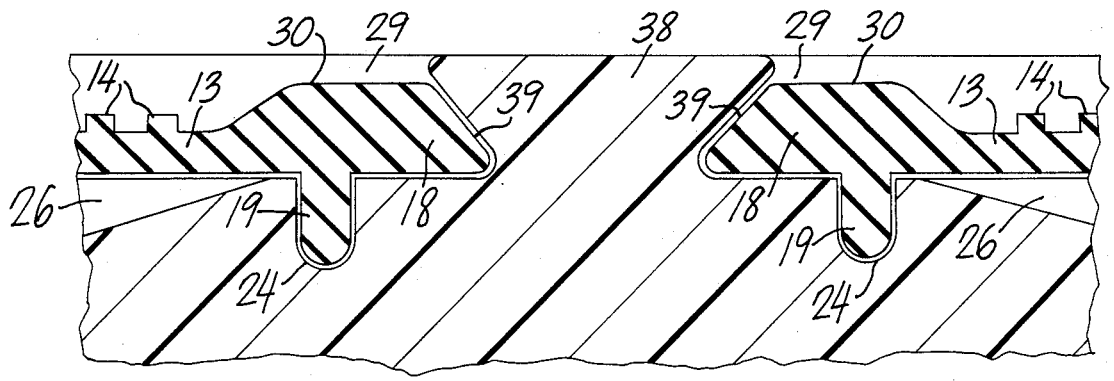
FIG. 8 is a cross section through the support projection and surrounding portion of the membrane.

The form of the support projection is shown more fully in the cross section of FIG. 8. It will here be seen that the support projection in cross section is formed as a truncated cone of which the smaller base is intregral with the base plate while the larger base lies in the plane of the edge portion 2 of the base plate. There is thereby provided an undercut shoulder surrounded by a recessed surface in which a groove is provided in the same manner as the groove 5 in the edge portion of the base plate. Moreover, around the opening 39 the membrane has an edge reinforcement 17 of angular cross section with a horizontal web 18 and perpendicular web 19, the construction of the base plate and the membrane around the support projection 38 being the same as around the circumferential edges of the base plate. It will be seen that the upper surface 30 of the web 18 of the membrane lies below the plane of the upper surface of the projection 38 to provide a space 29. The sealing of the membrane around the support projection 38 is thus effected in the manner described above.

What I claim is:

1. A membrane filter press comprising a plurality of base plates and elastic membranes and filter cloths between said base plates, each of said base plates having a raised circumferential edge portion surrounding a recess and having a plane surface and a circumferential recessed surface between said raised edge portion and said recess, with an undercut shoulder between said recessed surface and said raised edge portion and a circumferential groove in said recessed surface spaced from said shoulder, each said elastic membrane having an integral reinfored circumferential edge portion of angular cross section with a first web lying on said circumferential recessed surface and having a bevelled edge abutting said undercut shoulder and a second web fitting into said groove of said base plate, an outer surface of said first web lying below the plane of said plane surface of said raised circumferential edge portion of said base plate to provide a slot-form space between said first webs of adjacent membranes, the thickness of said space being greater than the thickness of of interposed filter cloths, said filter cloths overlying said elastic membranes with circumferential edge portions of said filter cloths only, and not said elastic membranes, clamped between said raised circumferential edge portions of said base plates.

2. A membrane filter press according to claim 1, in which said groove in said base plate in cross section has opposite parallel side walls and a rounded bottom.

3. A membrane filter press according to claim 2, in which said second web of said elastic membrane in cross sections has a rounded top fitting said rounded bottom of said groove in said base plate.

4. A membrane filter press according to claim 2 in which transition of said side walls of said groove into said recessed surface is rounded.

5. A membrane filter press according to claim 1, in which transition of said shoulder in cross section to said plane surface of said raised circumferential edge portion of said base plate is rounded.

6. A membrane filter press comprising a plurality of base plates and elastic membranes and filter cloths between said base plates, each of said base plates having a raised circumferential edge portion surrounding a recessed surface between said raised edge portion and said recess, with an undercut shoulder between said recessed surface and said raised edge portion, a circumferential groove in said recessed surface spaced from said shoulder and an inclined transition surface between said circumferential recessed surface and said recess,

- each said elastic membrane having an intergral reinforced circumferential edge portion of angular cross section with a first web lying on said circumferential recessed surface and having a bevelled edge abutting said undercut shoulder and a second web fitting into said groove of said base plate, an outer surface of said first web lying below the plane of said plane surface of said raised circumferential edge portion of said base plate,
- said filter cloths overlying said elastic membranes with circumferential edge portions of said filter cloths only, and not said membranes, clamped between said raised circumferential edge portions of said base plates,
- said base plate having in said recess an integral support projection spaced from said transition surface and having an outer surface in the plane of said plane surface of said raised circumferential edge portion for engagement with a like support projection of an adjacent base plate and in which said elastic membrane has an opening with a reinforced edge portion receiving said support projection.

7. A membrane filter press according to claim 6, in which said base plate has a groove surrounding said support projection and said elastic membrane has a rib fitting in said groove.

8. A membrane filter press according to claim 7, in which said support projection is bounded by a circumferential edge surface which in cross section is inclined at an acute angle to said outer surface of said support projections and in which said reinforced edge portion of said elastic membrane has an edge surface inclined at an obtuse angle to an outer surface of said reinforced edge portion.

* * * * *

UNITED STATES PATENT AND TRADEMARK OFFICE
CERTIFICATE OF CORRECTION

PATENT NO. : 4,826,593
DATED : May 2, 1989
INVENTOR(S) : Werner Neu

It is certified that error appears in the above-identified patent and that said Letters Patent is hereby corrected as shown below:

In the heading of the title page, correct the inventor's name to -- Neu --.

On the title page, column 1, correct item [75] as follows:

[75] Inventor; Werner Neu, Langenhagen, Fed. Rep. of Germany

Signed and Sealed this

Sixteenth Day of June, 1992

*Attest:*

DOUGLAS B. COMER

*Attesting Officer*   *Acting Commissioner of Patents and Trademarks*